June 1, 1926.
E. L. LEINBACH
1,587,126
COMBINED SHADE AND AWNING
Filed July 14, 1923   2 Sheets-Sheet 1
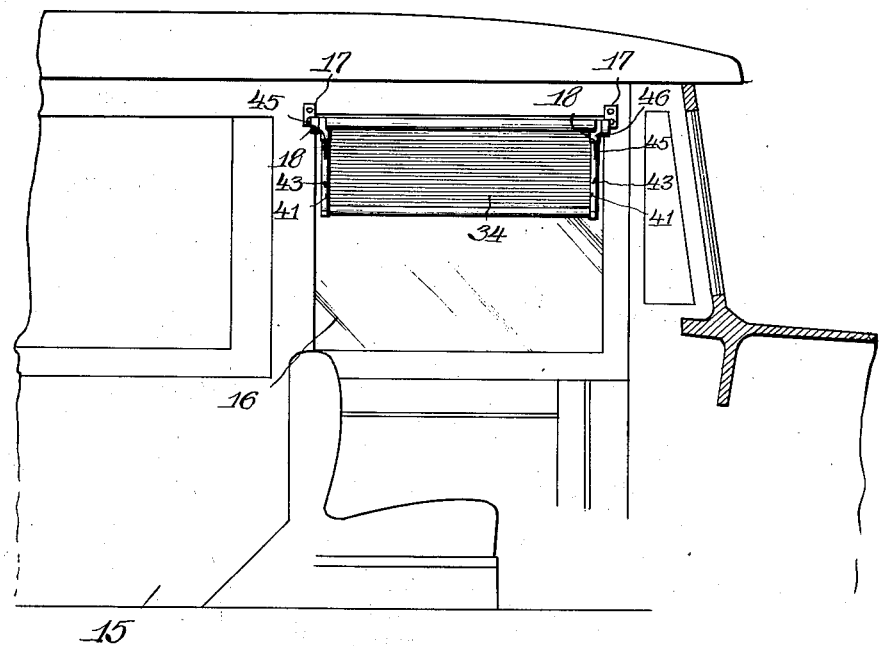
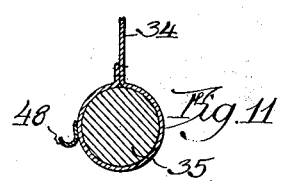
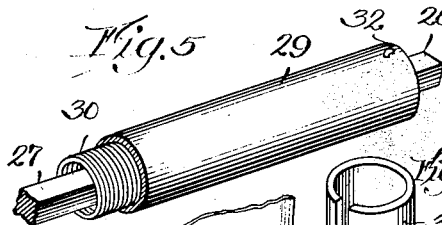
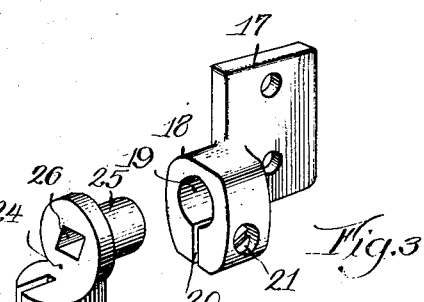
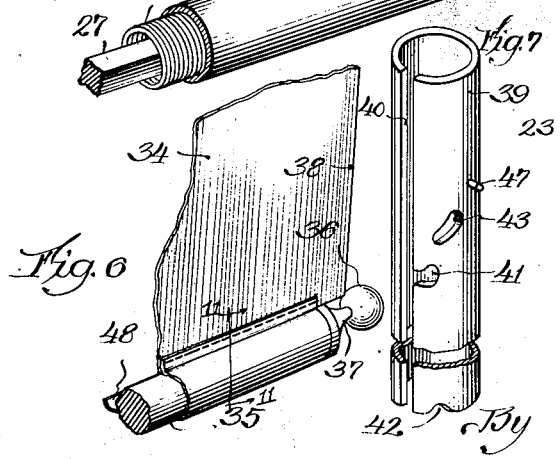
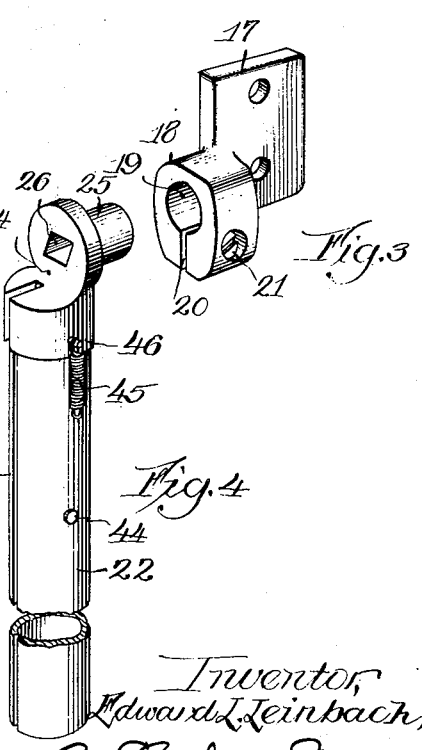

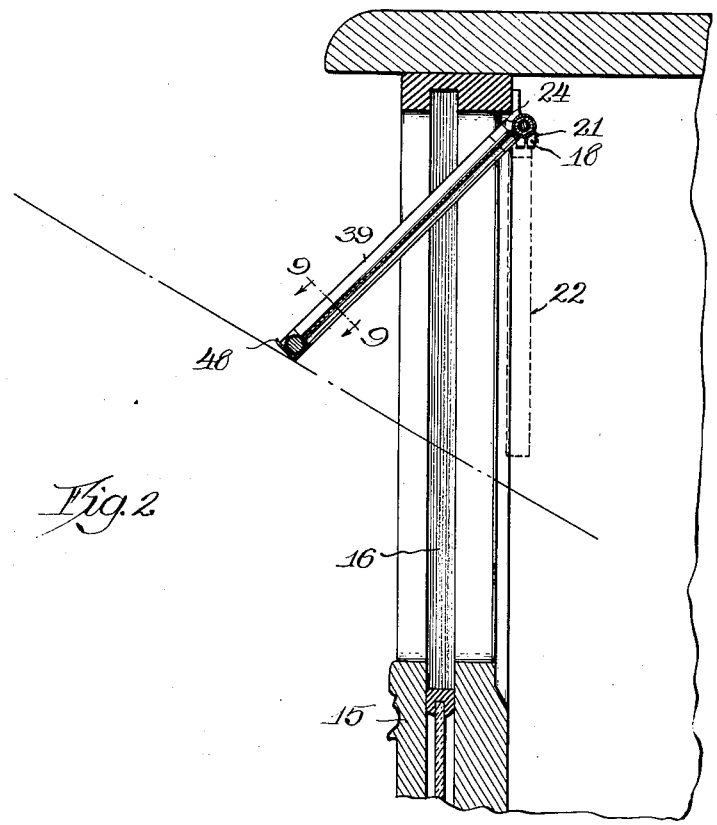
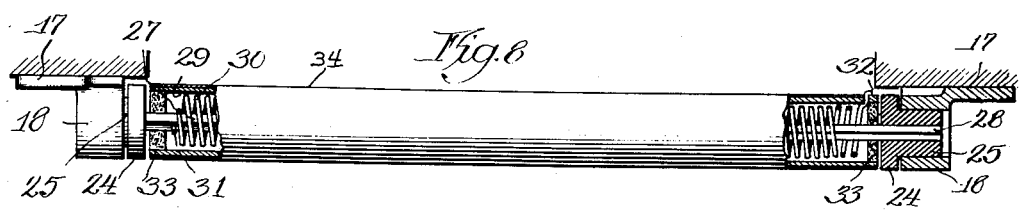
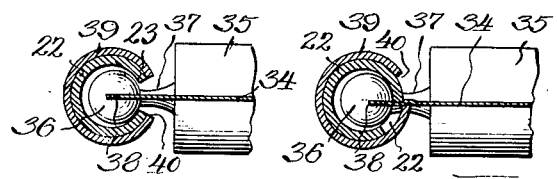
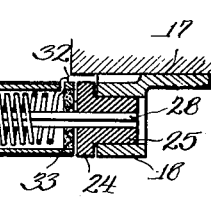

Patented June 1, 1926.

1,587,126

UNITED STATES PATENT OFFICE.

EDWARD L. LEINBACH, OF CHICAGO, ILLINOIS.

COMBINED SHADE AND AWNING.

Application filed July 14, 1923. Serial No. 651,496.

This invention relates to improvements in combined shade and awning particularly adapted, though not necessarily limited in its use, on automobiles for protecting the occupant of the vehicle from the hot sun and glare of the sun's rays.

A further object is to provide an improved device of this character which will not only exclude the sun's rays but will at the same time serve as an awning to exclude the rain, so as to permit the operator to allow the window of the vehicle to remain open while raining, thus permitting ventilation and a circulation of air through the vehicle.

A further object is to provide an improved device of this character adapted to be installed upon the inside of the vehicle to be used entirely within the vehicle and which is also adapted in its use to be projected through a window or door opening to extend beyond the outside of the vehicle.

A further object is to provide an improved device of this character embodying a flexible curtain or shade adapted to be rolled up and unrolled, and improved means for clamping or securing the entire exposed edges of the shade or curtain in a manner to constitute a rigid or metallic frame for the edges of the curtain for holding the latter firmly and taut against flapping when subjected to the action of the wind.

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating this invention, and in which:—

Figure 1 is a view of a portion of the inside of a motor vehicle, having a structure constructed in accordance with the principles of this invention applied thereto.

Figure 2 is a view of a portion of a vehicle showing the device in full lines as projected through the window opening and in dotted lines in position within the vehicle.

Figure 3 is a detail perspective view of one of the brackets for supporting the device.

Figure 4 is a detail perspective view partly broken away of one of the supports for the shade roller.

Figure 5 is a detail perspective view of a portion of the shade roller.

Figure 6 is a detail perspective view of a portion of the shade.

Figure 7 is a detail perspective view partly broken away of the securing device for holding the shade in its adjusted position.

Figure 8 is a view partly in plan and partly in section of the shade roller.

Figures 9 and 10 are sectional views taken on line 9—9, Figure 2, showing the means for clamping and securing the edges of the curtain, the securing means being shown in active and inactive positions.

Figure 11 is an enlarged detail sectional view taken on line 11—11, Figure 6.

Throughout the specification and claims the term "window opening" will be employed to designate the opening through which the shade is adapted to be projected, but it is to be understood that this is not to be considered as a limitation as the shade may be employed in connection with any other opening such as a door opening.

Referring more particularly to the drawings the numeral 15 designates generally a motor vehicle, having a window opening 16 therein.

Secured to the frame of the window opening 16 and on opposite sides of the opening are brackets 17, which may be of any desired size and configuration and may be secured in position in any suitable manner. These brackets 17 are each provided with a bearing member 18, having a bearing 19 therein and a split portion 20. A screw or bolt 21 passes through the bearing member 18 adjacent the split portion 20 so as to cause the opening 19 to be contracted or to permit the same to be expanded.

A pair of supports 22 are provided and are preferably of a hollow construction, each having an inwardly opening guideway 23. Each of the supports is preferably provided with a cap member 24, having a trunnion 25 connected therewith and these supports 22 may be of any desired length and diameter and constructed of any suitable material. The trunnions 25 are adapted to be journaled in the bearings 19 in the bearing members 18 and when inserted in the respective bearings the screw or bolt 21 may be adjusted to cause the desired friction upon the trunnions so that when the supports 22 are moved about the pivots formed by the trunnions and the bearing, the supports will be frictionally retained in their adjusted positions.

Each of the members 24 is provided with a seat 26, which may be of any desired configuration, but is preferably angular in cross section. A rod 27, which is preferably provided with angular extremities 28, extends across the space between the members 24 so that the extremities 28 of the rod will be seated in the seats 26, and being angular in cross section will conform to the contour of the seats so that the rod 27 will be held against rotation when the sleeve or roller 29, which is journaled upon the rod, is rotated.

This sleeve or roller 29 is of any desired diameter and is of a length that the extremities thereof will stand in close proximity to the face of the members 24, so that the roller will be held against longitudinal shifting movement. Within the roller 29 is arranged a coil spring 30, one end of which is anchored as at 31 to the rod 27 and the other extremity is anchored as at 32, to the roller 29.

If desired, washers 33 may be inserted in the ends of the roller 29 to form a closure therefor and to stand in close proximity to the members 24.

A shade or curtain 34 is secured by one end to the roller 29 and this shade is adapted to be wound upon and unwound from the roller 29. When the end of the shade 34 is pulled out it will be unwound from the roller 29 and the roller itself will be rotated about the bar 27 to store energy in the spring 30 so that when the shade 34 is released the spring 30 will reverse the direction of rotation of the roller 29 and wind up the shade thereon.

To the free end of the shade is secured a bar or rod 35, which is preferably provided with headed extremities 36, having a reduced portion 37 intermediate the head and the end of the rod.

The supports 22 are so disposed that the openings 23 will be opposed to each other and the head 36 and rod 35 are adapted to enter the supports 22 through one end thereof. The edges 38 of the shade are so arranged that when the heads 36 enter the support 22, the edges of the shade will also project through the openings 23 and into the support 22, as shown more clearly in Figures 9 and 10. This will cause the edges of the curtain to be guided during its winding and unwinding movements.

Encompassing each of the supports 22 is a sleeve or tubular member 39 having a slot 40 extending longitudinally therethrough. This sleeve or member is provided with a recess 41 which has communication with the slot 40 and also a recess or notch 42 in the lower end thereof. Any number of these slots or recesses 41 may be provided.

The sleeve or member 39 is of a diameter to fit snugly upon the support 22 so as to be axially rotated with respect thereto and may be held in position in any desired or suitable manner such as by means of an inclined slot 43, into which a pin 44 carried by the support 22 projects, so that when the element 39 is rotated with respect to the support 22, the inclined slot 43 will permit of a limited longitudinal movement of the element 39 with respect to the support 22.

The slot 40 is adapted to be brought into register with the open guideway 23 as shown more clearly in Figure 9, so as to permit the shade to be freely wound and unwound from the roller. The recess 41 is adapted to be moved so that the reduced portion 37 of the bar 35 will be seated therein when the shade is adjusted to a predetermined position and the element 39 rotated with respect to the support 22. This will hold the shade in its adjusted position. Likewise when the shade is withdrawn to its fullest extent so that the recess 42 may be positioned to receive the reduced portion 37 of the bar 35, the shade will be retained in its adjusted position.

Any suitable means may be provided which tends normally to rotate the element 39 with respect to the support 22 for gripping the edge 38 of the curtain. For that purpose a suitable spring 45, one end of which is anchored as at 46 to the member 24 and the other end is anchored to a pin or formation 47 carried by the element 39, is provided.

When the shade is adjusted the element 39 is rotated with respect to the support 22 against the stress of the spring 45, so that the parts will assume the positions shown in Figure 9. After the shade has been adjusted the element 39 may be released and the spring 45 will tend to rotate the element so as to cause one edge of the slot 40 to co-operate with one edge of the open guideway 23 (see Figure 10) to clamp the edge 38 of the shade 34 and thereby hold the edges of the shade taut and against a whipping action which might be caused by the action of air currents upon the shade.

With this improved construction it will be manifest that the shade will at all times be firmly held and its edges will be protected and secured within a rigid or metallic frame.

As a means for preventing the water from dropping from the shade into the vehicle or so that the air currents will strike the drops of water and blow the same into the vehicle, a suitable water shed such as a trough 48 may be provided adjacent the lower edge of the shade 34 and this trough 48, may if desired, be inclined so as to direct the water towards one edge of the shade.

It is thought that the operation of this device will be clearly understood from the foregoing, but briefly stated it is as follows. When the shade is secured in position and not in use, the supports 22 may be moved so that they will assume the positions shown in dotted lines in Figure 2, the friction between the trunnions 25 and the bearing members 18 serving to hold the parts in this position. The shade may be lowered when the supports are in this position by first rotating the element 39 to the position shown in Figure 9, after which the shade may be raised and lowered according to the position of the shade and when adjusted to its proper position the element 39 is released or may be rotated so that the recess 41 or the recess 42 will pass over the reduced portion 37 of the bar 35. When the element 39 is rotated in the opposite direction or to the position shown in Figure 9, the energy which has been created upon the spring 30 will tend to rotate the roller 29 and wind up the shade.

With this improved construction it will also be manifest that the shade may be adjusted by swinging the supports about their pivots so that the supports will project through the window opening 16 to any desired extent and angle and the friction between the trunnions 25 and bearing members 18 will hold the parts in their adjusted positions.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A frame having a window opening, supports pivotally mounted by one end adjacent the opening, inwardly opening guideways in the supports, a roller journaled adjacent the pivoted ends of the support, a flexible shade adapted to be rolled upon and unwound from the roller, a bar connected with the free end of the shade and movable in the guideways, means co-operating with the said guideways and the bar for maintaining the shade in its adjusted position, the said means being substantially co-extensive with the said guideways and co-operating therewith for clamping substantially the entire lateral edges of the shade, and means for securing the said supports in their adjusted positions about their pivots.

2. A frame having a window opening, supports pivotally mounted by one end upon the frame to one side of the opening and adapted for swinging movement through the opening, opposed guideways opening through and extending lengthwise of the supports, a spring controlled roller extending across the space between the supports and disposed adjacent their pivots, a shade connected with the roller, a bar connected with the free end of the shade and movable in the guideways, the edges of the shade also projecting into the guideways, means adapted to engage the bar to secure the shade in its adjusted position, the said means having formations co-operating with the respective guideways for clamping substantially the entire lateral edges of the shade, and means for securing the supports in their adjusted positions about their pivots.

3. A shade embodying a spring controlled roller, a curtain adapted to be wound thereupon and unwound therefrom, guides, the edges of the curtain adapted to project into and move within said guides, a concentric and slotted sleeve carried by each of the guides, the edges of the slots in the sleeves co-operating with the edges of the guides for clamping and holding the edges of the shade.

4. A shade embodying a spring controlled roller, a curtain adapted to be wound thereupon and unwound therefrom, guides, the edges of the curtain adapted to project into and move within said guides, a concentric and slotted sleeve carried by each of the guides, the edges of the slots in the sleeves co-operating with the edges of the guides for clamping and holding the edges of the shade, the said sleeves also operating to maintain the shade in its adjusted position with respect to the guides.

5. A shade embodying a spring controlled roller, a curtain adapted to be wound thereupon and unwound therefrom, guides, the edges of the curtain adapted to project into and move within said guides, a concentric and slotted sleeve carried by each of the guides, the edges of the slots in the sleeves co-operating with the edges of the guides for clamping and holding the edges of the shade, the said sleeves having formations for securing the shade in its adjusted position.

6. A frame having a window opening, supports pivotally mounted by one end adjacent the opening and adapted to be swung therethrough, open guideways in the supports, a roller, a shade on the roller, the edges of the shade extending into and movable within the guideways, means carried with the supports, substantially co-extensive with the said guideways and co-operating with the edges of the guideways for clamping and holding substantially the entire lateral edges of the shade, and means for maintaining the said supports in the positions into which they are moved about their pivots.

7. A frame having a window opening, supports pivotally mounted by one end adjacent the opening and adapted to be swung therethrough, open guideways in the supports, a roller, a shade on the roller, the edges of the shade extending into and movable within the guideways, means carried with the supports and co-operating with the edges of the guideways for clamping and holding substantially the entire lateral edges of the shade, means for maintaining the said supports in the positions into which they are moved about their pivots, and resilient means tending normally to render the first said means active.

8. A frame having a window opening, supports pivotally mounted by one end adjacent the opening and adapted to be swung therethrough, open guideways in the supports, a roller, a shade on the roller, the edges of the shade extending into and movable within the guideways, means carrier with the supports substantially co-extensive with the guideways and co-operating with the edges of the guideways for clamping and holding substantially the entire lateral edges of the shade, and securing means disposed adjacent the pivots of the said supports for maintaining the said supports in the positions into which they are moved about their pivots.

In testimony whereof I have signed my name to this specification, on this 10th day of July, A. D. 1923.

EDWARD L. LEINBACH.